United States Patent
Chai

(10) Patent No.: US 8,894,133 B2
(45) Date of Patent: Nov. 25, 2014

(54) FRONT PILLAR OF VEHICLE

(71) Applicant: Hyundai Motor Company, Seoul (KR)

(72) Inventor: Suk Jun Chai, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/710,303

(22) Filed: Dec. 10, 2012

(65) Prior Publication Data

US 2014/0117719 A1    May 1, 2014

(30) Foreign Application Priority Data

Oct. 26, 2012    (KR) .................. 10-2012-0119951

(51) Int. Cl.
*B60J 7/00*    (2006.01)
*B62D 25/04*    (2006.01)

(52) U.S. Cl.
CPC .................................... *B62D 25/04* (2013.01)
USPC .................. 296/203.02; 296/203.03; 296/205

(58) Field of Classification Search
USPC ............... 296/203.01, 146.6, 187.04, 187.13, 296/203.03, 209, 29, 30, 193.05, 187.12; 29/897, 897.2, 897.3
See application file for complete search history.

(56) References Cited

U.S. PATENT DOCUMENTS

| | | | |
|---|---|---|---|
| 5,575,500 A * | 11/1996 | Mimura et al. | 280/751 |
| 5,741,044 A * | 4/1998 | Kawai et al. | 296/187.05 |
| 6,095,593 A * | 8/2000 | Johann et al. | 296/187.05 |
| 6,340,203 B2 * | 1/2002 | Enomoto et al. | 296/203.02 |
| 2001/0040392 A1 * | 11/2001 | Yoshida | 296/203.02 |

FOREIGN PATENT DOCUMENTS

| | | |
|---|---|---|
| JP | 07-052822 | 2/1995 |
| JP | 2000-025647 | 1/2000 |
| JP | 2010-13019 A | 1/2010 |
| KR | 20-1999-0016647 | 5/1999 |

* cited by examiner

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

A front pillar structure of a vehicle may include an outer side panel disposed on an outer side in a traverse direction of a vehicle, an inner side panel attached to the outer side panel with an opening formed therebetween, and a reinforcement inserted through the opening between the inner side panel and the outer side panel, wherein the reinforcement may be attached to the outer side panel and the inner side panel to close the opening to have a closed cross-section.

11 Claims, 4 Drawing Sheets

FRONT PILLAR OF VEHICLE

CROSS-REFERENCE TO RELATED APPLICATION

The present application claims priority to Korean Patent Application No. 10-2012-011995.1 filed on Oct. 26, 2012, the entire contents of which is incorporated herein for all purposes by this reference.

BACKGROUND OF THE INVENTION

1. Field of the Invention

The present invention relates to a front pillar structure of a vehicle. More particularly, the present invention relates to a front filler of a vehicle which can expand the front view of a driver.

2. Description of Related Art

In general, a pillar connects and supports the roof of a vehicle to the car body and a plurality of pillars is formed in the longitudinal direction of a vehicle.

The front pillar at the front in the longitudinal direction of a vehicle is called an A-pillar or an A-post and supports both sides of a windshield glass in the transverse direction of the vehicle and supports the front end of the roof in the longitudinal direction of the vehicle.

Since the front pillar of a vehicle is positioned in the front view of the driver in the driver's seat, it necessarily blocks the view of the driver, such that a dead zone that the driver cannot see due to the front filler is generated ahead of the vehicle.

Therefore, a traffic accident may occur due to the dead zone, when a vehicle urns left or right.

Therefore, the less the size of the dead zone defined by the front pillar by reducing the size of the front pillar as small as possible, the less the danger of a traffic accident due to the dead zone.

However, since the front pillar supports the windshield glass and the roof; it needs appropriate rigidity, and it has rigidity too for appropriately coping with a front collision of a vehicle, such that it is difficult to freely reduce the size of the front pillar.

Therefore, a front pillar is necessarily designed to have rigidity for appropriately supporting the windshield glass and the roof and rigidity for appropriately coping with a front collision and not interfering with the front view of a driver as much as possible.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front pillar of a vehicle having advantages of being able to appropriately supporting the windshield glass and the roof of a vehicle, to effectively cope with a front collision of the vehicle, and to expand the front view of a driver as large as possible.

In an aspect of the present invention, a front pillar structure of a vehicle, may include an outer side panel disposed on an outer side in a traverse direction of a vehicle, an inner side panel attached to the outer side panel with an opening formed therebetween, and a reinforcement inserted through the opening between the inner side panel and the outer side panel, wherein the reinforcement is attached to the outer side panel and the inner side panel to close the opening to may have a closed cross-section.

The closed cross-section is in a shape of a rectangle.

The rectangle has a flat first side attached to the outer side panel, a flat second side connected to the first side and facing an interior of the vehicle, a flat third side connected to the second side and attached to the inner side panel, and a flat fourth side connecting the flat third side with the flat first side.

The reinforcement is one member integrally forming the closed cross-section.

The reinforcement is manufactured by hydrofoaming.

The reinforcement may include a first reinforcement and a second reinforcement that form the closed cross-section when combined.

The first reinforcement, one end of which is attached to the outer side panel, wherein the second reinforcement, one end of which is connected to the one end of the first reinforcement and the other end of which is connected to the other end of the first reinforcement and the side inner panel.

Upper surface of the second reinforcement is substantially horizontally aligned with the vehicle.

A front end of a windshield glass disposed in the transverse direction of the vehicle overlaps a portion of the outer side panel, above the outer side panel in a height direction of the vehicle, wherein a trim is disposed at an interior of the vehicle to cover the inner side panel and the reinforcement.

The outer side panel has a lower portion matching with a cowl, and an upper portion inclined in a height direction of the vehicle from a side of the lower portion spaced from the cowl.

A windshield glass is seated and supported on the lower portion between the cowl and the upper portion, the cowl, the roof, and the upper portion.

The front end of the outer side panel may have a step that separates a windshield glass seating section where a windshield glass is seated, from an attachment section attached to the reinforcement.

The second side is aligned with the line of the driver's gaze.

The second side is substantially horizontally aligned with the vehicle.

According to an exemplary embodiment of the present invention, it is possible to enlarge the driver's front view as large as possible by reducing the width of the front pillar as small as possible, not to block the driver's front view as much as possible, with appropriate rigidity.

Further, the front pillar can more stably support the windshield glass and the roof of a vehicle, with rigidity improved by the reinforcement forming a closed cross-section, and can effectively cope with a front collision of a vehicle.

Further, as the front pillar has as small width as possible, it is possible to reduce width, and when a windshield glass with an increased width is mounted on the front pillar, a sealer is not separated, watertightness is correspondingly not deteriorated, and the sealer is not contaminated when a trim is mounted.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
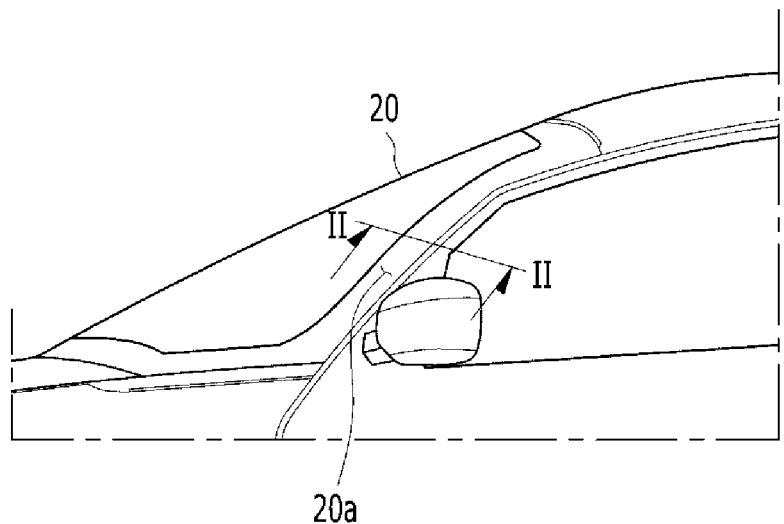
FIG. 1 is a perspective view cutting a portion of a vehicle equipped with a front pillar according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 2:
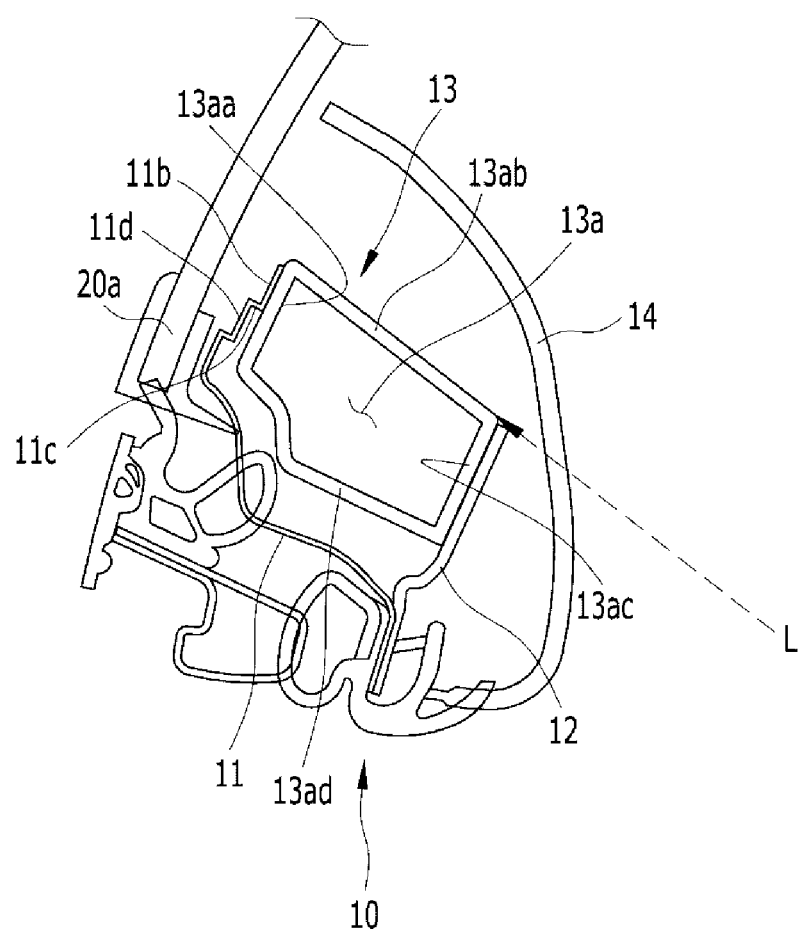
FIG. 2 is a cross-sectional view taken along line II-II in FIG. 1.

Referring to FIGS. 1 and 2, a front pillar 10 of a vehicle according to an exemplary embodiment of the present invention is covered by a windshield glass 20 and not exposed to the outside, when seen from the outside in front of a vehicle.

That is, the windshield glass 20 further extends to the skin of the front pillar of the related art in the transverse direction of the vehicle, as compared with the windshield glass of the related art, and the front pillar 10 is disposed rearward from the front end 20a in the transverse direction of the vehicle, such that the front pillar 10 is covered by front end 20a.

The front pillar 10 may include an outer side panel 11 disposed on an outer side in the transverse direction of the vehicle, a side inner panel 12 attached to the outer side panel 11 with an opening therebetween, and a reinforcement 13 inserted through the opening and attached to the side outer panel 11 and the side inner panel 12 to close the opening.

The front end 20a of the windshield glass 20 overlaps a portion of the outer side panel 11, above the outer side panel 11 in the height direction of the vehicle.

A trim 14 is disposed at the interior of the vehicle to cover the inner side panel 12 and the reinforcement 13.

The reinforcement 13 has a closed cross-section 13a.

The closed cross-section 13a is formed in a substantially rectangular shape, but may be formed in other shapes.

The reinforcement 13 is a member defining the closed cross-section 13a, and for example, may be manufactured by hydroforming to form the closed cross-section 13a.

The rectangle formed by the closed cross-section 13a may have a flat first side 13aa attached to the outer side panel 11, a flat second side 13ab connected to the first side 13aa and facing the interior of the vehicle, a flat third side 13ac connected to the second side 13ab and attached to the inner side panel 12, and a flat fourth side 13ad connecting the third side 13ac with the first side 13aa and facing a side of a door of the vehicle.

The second side 13ab is aligned with the line L of the driver's gaze, such that the front pillar 10 according to an exemplary embodiment of the present invention does not interfere with the driver's gaze as much as possible.

The front end of the outer side panel 11 may have a step 11c that separates an attachment section 11b welded to the reinforcement 13 from a windshield glass seating section 11d, where the windshield glass 20 is seated, using a height difference.

As described above, as the attachment section 11b welded to the reinforcement 13 and the windshield glass seating section 11d where the windshield glass 20 is seated are separated with a height difference by the step 11c, there is no concern that a sealer is not separated due to interference between the windshield glass 20 and the sealer, when the windshield glass 20 is loaded.

Figure 3:
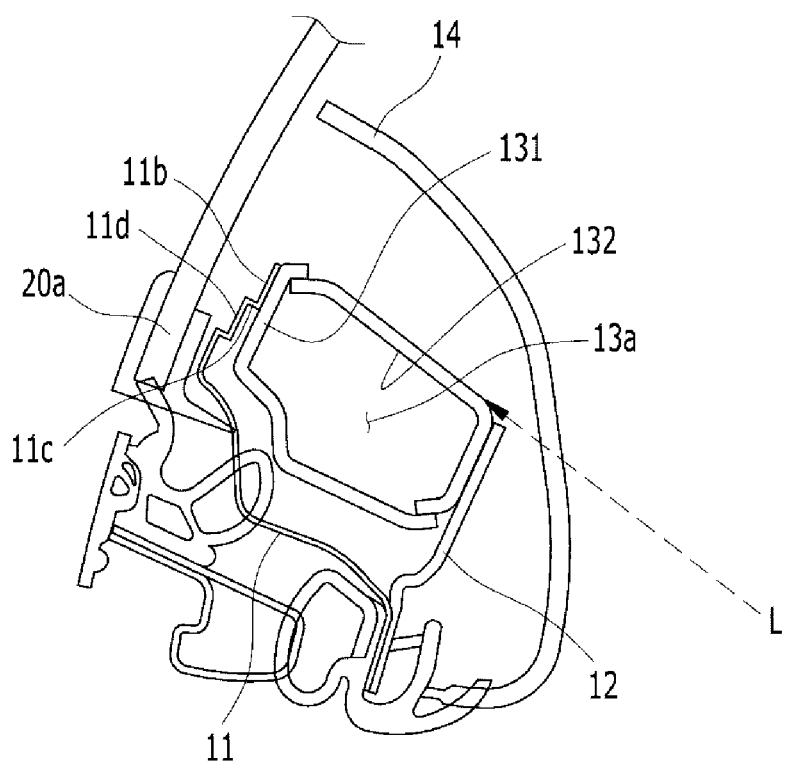
FIG. 3 is a cross-sectional view of a front pillar equipped with a reinforcement according to another exemplary embodiment of the present invention.

Referring to FIG. 3, the reinforcement 13 may be formed by separately manufacturing a first reinforcement 131 and a second reinforcement 132 and then combing them to form the closed cross-section 13a.

The first reinforcement 131 and the second reinforcement 132 may be formed by pressing.

As the reinforcement 13 having a dosed cross-section is attached to the outer side panel 11 and the inner side panel 12, the structural rigidity of the pillar is improved, such that it is possible to form the front pillar with as small width as possible not to block the front view of the driver as much as possible.

Figure 4:
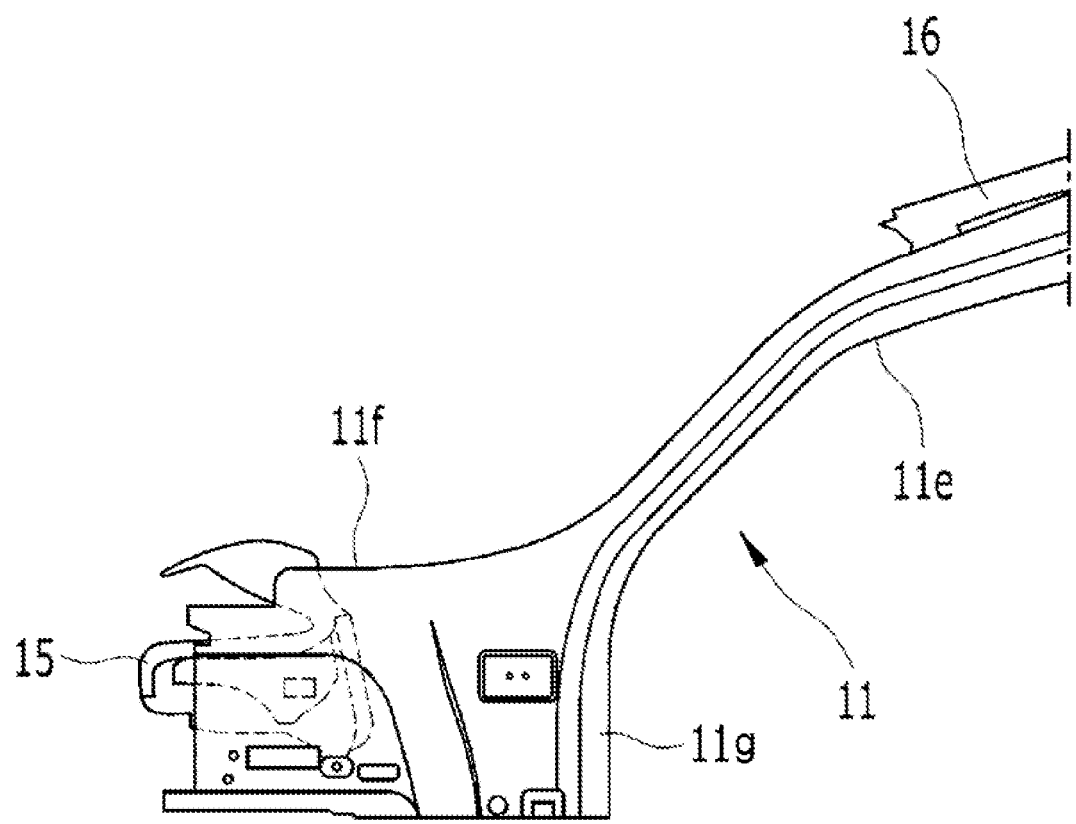
FIG. 4 is a side view of an outer side panel according to an exemplary embodiment of the present invention.

Referring to FIG. 4, the outer side panel 11 may have a lower portion 11g matching with a cowl 15 and an upper portion 11e inclined in the height direction of the vehicle from a side of the lower portion 11g, which is spaced from the cowl 15, and connected with a roof 16 of the vehicle.

A seat 11f having a predetermined length is formed between the cowl 15 and the upper portion 11e, above the lower portion 11g, and the windshield glass 20 is seated and supported in the seat 11f.

That is, the windshield glass 20 can be seated on the seat 11f, the cowl 15, the roof 16, and the upper portion 11e, and stably supported.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front pillar structure of a vehicle, comprising:
   an outer side panel disposed on an outer side in a traverse direction of a vehicle;
   an inner side panel having:

a first end attached to a first end of the outer side panel; and a second end spaced from a second end of the outer side panel to form an opening therebetween;

a reinforcement inserted through the opening between the second ends of the inner side panel and the outer side panel, wherein the reinforcement is attached to the second ends of the outer side panel and the inner side panel to close the opening to have a closed and hollow cross-section;

wherein the closed cross-section is in a shape of a rectangle; and wherein the rectangle has:
- a flat first side attached to the outer side panel;
- a flat second side connected to the first side and facing an interior of the vehicle;
- a flat third side connected to the second side and attached to the inner side panel; and
- a flat fourth side connecting the flat third side with the flat first side; and wherein the second side is aligned with a line of the driver's gaze.

2. The front pillar structure of claim 1, wherein the reinforcement is one member integrally forming the closed cross-section.

3. The front pillar structure of claim 2, wherein the reinforcement is manufactured by hydroforming.

4. The front pillar structure of claim 2, wherein the reinforcement includes a first reinforcement and a second reinforcement that form the closed cross-section when combined.

5. The front pillar structure of claim 4,
wherein the first reinforcement, one end of which is attached to the outer side panel; and wherein the second reinforcement, one end of which is connected to the one end of the first reinforcement and the other end of which is connected to the other end of the first reinforcement and the side inner panel.

6. The front pillar structure of claim 5, wherein upper surface of the second reinforcement is substantially horizontally aligned with the vehicle.

7. The front pillar structure of claim 1,
wherein a front end of a windshield glass disposed in the transverse direction of the vehicle overlaps a portion of the outer side panel, above the outer side panel in a height direction of the vehicle, and wherein a trim is disposed at an interior of the vehicle to cover the inner side panel and the reinforcement.

8. The front pillar structure of claim 1, wherein the outer side panel has:
- a lower portion matching with a cowl; and
- an upper portion inclined in a height direction of the vehicle from a side of the lower portion spaced from the cowl.

9. The front pillar structure of claim 8, wherein a windshield glass is seated and supported on the lower portion between the cowl and the upper portion, the cowl, the roof, and the upper portion.

10. The front pillar structure of claim 1, wherein the front end of the outer side panel has a step that separates a windshield glass seating section where a windshield glass is seated, from an attachment section attached to the reinforcement.

11. The front pillar structure of claim 1, wherein the second side is substantially horizontally aligned with the vehicle.

* * * * *